Patented Aug. 26, 1952

2,608,553

UNITED STATES PATENT OFFICE 2,608,553

INTERPOLYMERS OF VINYL CHLORIDE, HIGHER ALKYL ACRYLATE, AND DIVINYL ARYL HYDROCARBON

Robert J. Wolf, Cleveland, Ohio, assignor to The B. F. Goodrich Company, New York, N. Y., a corporation of New York No Drawing. Application April 25, 1950, Serial No. 158,063

5 Claims. (Cl. 260—80.5)

The present invention relates to interpolymers obtained by the polymerization of monomeric mixtures containing at least three monomeric components, each in particular proportions, one of which is vinyl chloride, another of which is a higher alkyl acrylate such as an octyl acrylate, and another of which is a divinyl aryl hydrocarbon such as divinyl benzene, which interpolymers possess various new and improved properties, especially in regard to their inherent plasticity and ease of processing combined with hardness and excellent strength in final end use, and it pertains particularly to three-component interpolymers or tripolymers of these three types of monomers which are so inherently plasticized in nature as to be processed and made into excellent films, sheets, rods, tubes and plates without the addition of plasticizers.

Vinyl resins such as polyvinyl chloride and copolymers of vinyl chloride with various other monomeric materials such as methyl acrylate, vinyl acetate, vinylidene chloride and others are well known to the art and in their plasticized forms are widely used in numerous applications. The thermoplastic vinyl resin is itself relatively hard and horny at normal temperatures and is generally incapable of being easily subjected to processing operations such as milling, calendering, extruding, etc., without heating the resin to high temperatures. Addition of plasticizers, which generally are of the oily ester type, lowers the softening point of the composition such that the processing operations may be carried out at lower temperatures. However, addition of plasticizer concomitantly lowers the room temperature hardness of the plasticized composition and frequently makes the resin somewhat tacky. It is thus difficult to produce a plasticized vinyl resin composition which is easily processed at moderate temperatures yet which in the final end product will have the many-times desirable properties of hardness, rigidity, etc.

There are additional disadvantages necessarily attending the use of plasticizers in vinyl resin compositions. The plasticizers commonly employed have a pronounced tendency to bleed or migrate to the surface of the composition, where they are lost through wiping, washing or volatilization with the result that the composition gradually stiffens and hardens and consequently fails in service. Moreover the migration of plasticizer destroys the adhesive bonds between the plastic and other surfaces and mars varnished surfaces in contact with the plastic.

It is a primary object of this invention, therefore, to provide a new class of vinyl resins each member of which is possessed of many of the desirable properties of known vinyl resins but which is so inherently processable as not to require the addition of plasticizers either during processing or to achieve desirable plastic properties in the final product and which, on that account, can be employed to produce numerous articles which are more durable, serviceable and otherwise desirable. Another object is to provide a vinyl plastic which is not subject to loss of plasticity by volatilization, bleeding or extraction of plasticizer. It is also an object to provide new vinyl resins which are easily subjected to processing operations at moderately elevated temperatures yet which are not excessively soft or tacky and have desirable stiffness, rigidity and high strength at normal temperatures. The attainment of these and other objects will become readily apparent in the description of the invention which is to follow.

I have discovered that by polymerizing, preferably in an aqueous medium, monomeric mixtures containing at least three components, each in definite proportions, one being vinyl chloride, another a higher alkyl ester of acrylic acid such as an octyl acrylate, and the third a divinyl aryl hydrocarbon, as hereinafter defined, I am able to obtain novel interpolymers having the properties necessary for achieving the above and other objectives.

The relative proportions of monomers which are employed in the production of my interpolymers are somewhat critical, since the desired properties are not secured in any proportion, but may vary within certain limits. In the monomeric mixture I have found it necessary to employ from 35 to 95% by weight of vinyl chloride, from 5 to 65% by weight of higher alkyl acrylate, and from 0.01 to 5.0% by weight of divinyl aryl hydrocarbon with at least 90% by weight of the monomeric mixture made up of these three types of ingredients. Other monomeric materials such as vinylidene chloride, diethyl fumarate, vinyl benzoate, acrylonitrile, styrene, isobutylene, lower alkyl acrylates such as methyl and ethyl acrylate, and others are, if desirable, utilized to the extent of 10% by weight of the monomeric mixture without substantially affecting the desirable properties. Particularly valuable are those interpolymers or tripolymers made from three component monomeric mixtures containing from 50 to 85 parts by weight of vinyl chloride, from 15 to 50 parts of higher alkyl acrylate, and from 0.1 to 2.0 parts by weight of divinyl aryl hydrocarbon.

The higher alkyl acrylates which are employed in this invention are those alkyl esters of acrylic acid in which the alkyl group contains a chain of from 5 to 10 carbon atoms. I have found that the degree of plasticity or inherent processability imparted to my new interpolymers by these higher alkyl acrylates corresponds roughly with the observed degree of plasticization imparted to ordinary vinyl resins by addition thereto of ester type plasticizers containing similar alkyl groups. For example, di-2-ethylhexyl phthalate is an excellent plasticizer for vinyl chloride polymers and 2-ethylhexyl acrylate has been found to produce interpolymers possessing inherent processability to a high degree. Illustrative higher alkyl acrylates within the above class utilizable in this invention include n-amyl acrylate, n-hexyl acrylate, the isohexyl acrylates, isoheptyl acrylates, n-heptyl acrylate, capryl acrylate (1-methylheptyl acrylate), n-octyl acrylate, 2-ethylhexyl acrylate, isooctyl acrylates such as 6-methylhexyl acrylate, n-nonyl acrylate, isononyl acrylates such as 3,5,5-trimethylhexyl acrylate, n-decyl acrylate and others.

It is greatly preferred to employ higher alkyl acrylates in which the alkyl group contains a total of 8 to 10 carbon atoms and possesses a carbon chain of 6 to 10 carbon atoms. Compounds within this class are 6-methylheptyl acrylate, 3,5,5-trimethylhexyl acrylate, 2-ethylhexyl acrylate, capryl acrylate, n-octyl acrylate, and others. This preferred class of higher alkyl acrylates has been found to impart a high degree of inherent processability to the interpolymers of this invention and n-octyl acrylate appears to be the most efficient in this respect.

The divinyl aryl hydrocarbons utilizable in the production of my new interpolymers are any of the polymerizable aryl hydrocarbons possessing two vinyl

groups attached to nuclear carbon atoms. Divinyl aryl hydrocarbons of this class include 1,4-divinyl benzene, 1,2-divinyl benzene, 1,3-divinyl benzene, 1,4-divinyl naphthalene, 1,6-divinyl naphthalene, 1,7-divinyl naphthalene, 1,8-divinyl naphthalene and others. 1,4-divinyl benzene because of its ready availability, lower cost, and its ability to produce superior interpolymers according to this invention is the preferred divinyl aryl hydrocarbon.

The polymerization of monomeric mixture to produce my new interpolymers may be carried out in various ways depending upon whether it is desired to use a solid polymer or a solution of latex of the interpolymer in the production of the final product. It is preferred to carry out the polymerization in an aqueous emulsion, which may or may not contain an added emulsifying agent, when an aqueous polymeric dispersion is the desired end product. When an interpolymer is desired for the production of clear transparent sheets and films, it may be preferred to polymerize the mixture of monomers in an aqueous medium containing a very small amount only of an emulsifier or none at all, such method being a "soapless" polymerization reaction. In addition the mixture of monomers may be polymerized in an aqueous medium containing a colloidal protective substance such as gelatin, bentonite clay, polyvinyl alcohol, polyacrylic acid, and others to obtain a fine granular or pearl-like polymer. The latter aqueous suspension method is a satisfactory method for producing polymer intended to be processed directly in solid form. The mixtures of monomers also may be polymerized in a suitable solvent or in mass in the absence of a solvent or diluent.

Whatever method of polymerization is employed a catalyst is generally required. The catalyst may be any of the catalysts commonly employed for the polymerization of vinyl compounds. Actinic radiation may be employed, as well as the various peroxygen compounds such as hydrogen peroxide, benzoyl peroxide, o,o'-dichlorobenzoyl peroxide, caproyl peroxide, caprylyl peroxide, pelargonyl peroxide, cumene hydroperoxide, tertiary butyl hydroperoxide, 1-hydroxycyclohexyl hydroperoxide, tertiary butyl diperphthalate, tertiary butyl perbenzoate, sodium, potassium and ammonium persulfate, sodium perborate, sodium percarbonate, and others. The various peroxygen catalysts may be utilized in combination with a reducing substance such as a polyhydroxy phenol, sodium sulfite and the like in what is commonly referred to as a "redox" polymerization. Both the oxidizing and redox catalysts reach their fullest activity when used in combination with a small amount of a heavy metal salt such as silver nitrate, copper sulfate, various ferric salts, etc.

In some instances it also may be desirable to control or adjust the hydrogen ion concentration of the polymerization mixture, which tends to become more acid because of liberation of hydrochloric acid during the polymerization. It is preferred therefore to add a buffering substance to the reaction mixture. For this purpose such substances as sodium bicarbonate, sodium carbonate, disodium phosphate, trisodium phosphate, ammonium hydroxide, sodium hydroxide, the amino-substituted alcohols such as 2-amino-2-methyl-1-propanol and the like and others are suitable.

When the monomeric mixture is polymerized in aqueous emulsion a wide variety of emulsifying agents may be utilized. Suitable materials are for example ordinary soaps such as sodium oleate, potassium palmitate, sodium myristate, ethanol-amine laurate, and rosin and disproportionated rosin acid soaps; synthetic saponaceous materials such as the salts of alkaryl sulfonic acids, or of acid sulfuric esters of long chain alcohols such as sodium isopropyl naphthalene sulfonate, sodium lauryl sulfate, and the sodium salts of sulfonated petroleum fractions and others.

While the polymerization may be carried out under an atmosphere containing air or oxygen, the rate of reaction is ordinarily faster under an atmosphere substantially free of oxygen and hence polymerization in an evacuated vessel or under an inert atmosphere is preferred. The temperature at which the reaction is carried out is not critical, it may be varied widely from —30° C. to 100° C. or higher, though best results are generally obtained at a temperature in the range of 0° C. to 70° C.

In order to minimize variation in the rate of reaction and to maintain a given proportion of each of the three types of monomers in the reaction mixture throughout the reaction cycle, and especially when conducting the polymerization of large batches of monomers, it is sometimes desirable to introduce the acrylate monomer and/or the divinyl aryl hydrocarbon in increments or gradually during the course of the polymerization. The acrylate and the divinyl compound may be premixed and added to the reaction vessel at a rate consistent with that at which these monomers are "used up" in the reaction.

The preparation of the interpolymers of this invention, their properties and representative uses will be more clearly described in the following specific examples which are intended merely as illustrations of the nature of my invention and not as limitations on the scope thereof.

*Example 1*

A tripolymer is prepared by the polymerization of the monomeric materials in a reaction mixture having the following composition:

| Material | Parts by Weight |
| --- | --- |
| Vinyl chloride | 65.0 |
| 2-ethylhexyl acrylate | 34.0 |
| 1,4-divinyl benzene | 1.0 |
| Emulsifier [1] | 4.0 |
| Ammonia | 0.2 |
| Potassium persulfate | 0.6 |
| Water | 95.6 |

[1] A sodium salt of a sulfonated petroleum fraction known as "Duponol 189 S."

The water, potassium persulfate and emulsifier are charged to the reactor which is then sealed and evacuated. The ammonia and monomers are then added and the resultant mixture agitated and heated to 50° C. In 20 hours and 20 minutes at 50° C. the reaction proceeds to substantial completion with the production of a latex containing in excess of 50% total solids. The latex when cast on a clean surface and dried at room temperature forms a good clear film. When such a film is heated for 10 minutes at 135° C. an excellent clear film is obtained having a tensile strength of 2670 pounds per square inch and an elongation of 140%. The finished film is clear, dry and tack free and has remarkable resistance to heat aging as shown by no change in properties after heat aging for 7 days at 100° C.

The solid tripolymer derived from the coagulation of the tripolymer latex of Example 1 is easily milled without plasticizer on a mill having the rolls maintained at only 160° F. When the solid tripolymer is press molded without plasticizer for 1 minute at 140° C. a clear, completely fused disc is produced. The hardness of the press molded sheet of trioplymer is 95 Durometer A. The tripolymer is easily extruded without plasticizer to form hard rigid tubes and rods.

Tripolymers made in a similar manner utilizing monomeric mixtures containing respectively 2%, 4% and 5% of divinyl benzene based on the total weight of monomers are progressively harder and stiffer in nature, yet can be processed without plasticizer.

*Example 2*

A monomeric mixture consisting of 55 parts by weight of vinyl chloride, 35 parts of 3, 5, 5-trimethylhexyl acrylate, 10 parts by weight of styrene and 0.5 part by weight of 1,4-divinyl benzene is polymerized in aqueous emulsion in the manner of Example 1 to produce an excellent stable latex. The solid tetrapolymer obtained by coagulation of such latex, when molded for 3 minutes at 140° C. forms a completely fused, clear and flexible disc having good heat and light resistance and which is otherwise similar to the tripolymer of the previous example.

*Example 3*

A mixture consisting of 65 parts by weight of vinyl chloride, 30 parts by weight of 2-ethylhexyl acrylate, 5 parts by weight of isobutylene and 0.1 part by weight of 1,4-divinyl benzene is polymerized as in Example 1 in 38½ hours at 20° C. to form an excellent latex which deposits a clear film on drying at room temperature and which is admirably adapted to the formation of coated papers, leather, fabrics, etc.

*Example 4*

The interpolymers of this invention can be made with considerable variation, within limits, in the amount of vinyl chloride and higher alkyl acrylate employed. For example, a tripolymer made, as in the previous examples, from a monomeric mixture containing only 35% by weight of vinyl chloride, 64% by weight of isononyl acrylate and 1% by weight of 1,4-divinyl benzene has exceptional processability without plasticizers yet is not excessively soft at room temperature. Another tripolymer made by the polymerization in aqueous emulsion as in the preceding examples of a monomeric mixture consisting of 80 parts by weight of vinyl chloride, 20 parts by weight of n-octyl acrylate and 0.5 part by weight of 1,4-divinyl benzene is a hard rigid resin at room temperature yet is easily milled on a two roll plastic mill having its rolls maintained at only 160 to 170° F. The tripolymer may be calendered on a four roll calender having its rolls maintained at only 200° F. to produce a clear but stiff film of about 10 mil thickness which is admirably adapted for food packaging and the like.

The substitution in the previous examples of 1,4-divinyl naphthalene or 1,2-divinyl benzene for 1,4-divinyl benzene produces generally equivalent interpolymers varying only slightly in hardness but which like the interpolymers of the previous examples also are easily processable without plasticizers.

While the invention has been described with particular reference to certain preferred embodiments thereof, it is possible to make variations and modifications therein without departing from the spirit and scope of the invention as defined in the appended claims.

I claim:

1. An interpolymer made by polymerizing a mixture of monomeric materials comprising from 50 to 85% by weight of vinyl chloride, from 15 to 50% by weight of an alkyl ester of acrylic acid in which the alkyl group contains from 8 to 10 carbon atoms and possesses a carbon chain of from 6 to 10 carbon atoms in length, and from 0.1 to 2.0% by weight of a divinyl aryl hydrocarbon possessing two vinyl groups attached to nuclear carbon atoms, at least 90% by weight of the said monomeric mixture being composed of the enumerated monomeric materials.

2. A tripolymer made by polymerizing in aqueous emulsion a mixture of monomeric materials consisting of from 50 to 85 parts by weight of vinyl chloride, from 15 to 50 parts by weight of an alkyl ester of acrylic acid in which the alkyl group contains from 8 to 10 carbon atoms and possesses a carbon chain of from 6 to 10 carbon atoms in length, and from 0.1 to 2.0 parts by weight of 1,4-divinyl benzene.

3. A tripolymer made by polymerizing in aqueous emulsion a monomeric mixture consisting of 50 to 85 parts by weight of vinyl chloride, from 15 to 50 parts by weight of 2-ethylhexyl acrylate, and from 0.1 to 2.0 parts by weight of 1,4-divinyl benzene.

4. An interpolymer made by polymerizing in aqueous emulsion a monomeric mixture comprising 35 to 95% by weight of vinyl chloride, from 5 to 65% by weight of 3,5,5-trimethylhexyl acrylate, and from 0.01 to 5.0% by weight of 1,4-divinyl benzene.

5. A tripolymer made by polymerizing in aqueous emulsion a monomeric mixture consisting of 50 to 85 parts by weight of vinyl chloride, from 15 to 50 parts by weight of n-octyl acrylate, and from 0.1 to 2.0 parts by weight of 1,4-divinyl benzene.

ROBERT J. WOLF.

REFERENCES CITED

The following references are of record in the file of this patent:

UNITED STATES PATENTS

| Number | Name | Date |
| --- | --- | --- |
| 2,202,846 | Garvey et al. | June 4, 1940 |
| 2,496,384 | Nie | Feb. 7, 1950 |

OTHER REFERENCES

Rehberg et al., Ind. Eng. Chem., 40, 1429–33 (Aug. 1948).